(12) United States Patent
Yamamoto et al.

(10) Patent No.: US 6,640,596 B2
(45) Date of Patent: Nov. 4, 2003

(54) APPARATUS FOR DETECTING INTENSITY OF SHOT PEENING AND REPLACEMENT UNIT FOR THE APPARATUS

(75) Inventors: Masatoshi Yamamoto, Toyokawa (JP); Hideaki Kaga, Toyokawa (JP)

(73) Assignee: Sintokogio Ltd., Aichi-ken (JP)

( * ) Notice: Subject to any disclaimer, the term of this patent is extended or adjusted under 35 U.S.C. 154(b) by 8 days.

(21) Appl. No.: 10/116,084
(22) Filed: Apr. 5, 2002
(65) Prior Publication Data

US 2002/0144529 A1 Oct. 10, 2002

(30) Foreign Application Priority Data

Apr. 5, 2001 (JP) ......................................... 2001-106813

(51) Int. Cl.[7] .................................................. B21J 5/10
(52) U.S. Cl. ......................... 72/53; 73/11.02; 73/861.73
(58) Field of Search ........................... 72/53; 73/861.71, 73/861.73, 861.76, 11.02, 12.01, 12.05, 12.09; 29/90.7; 451/39

(56) References Cited

U.S. PATENT DOCUMENTS 4,470,292 A * 9/1984 DeClark et al. ............ 73/11.02
5,113,680 A * 5/1992 Matsuura et al. ............... 72/53

FOREIGN PATENT DOCUMENTS

| JP | 04-019071 | 1/1992 | | |
| JP | 07214472 A | * 8/1995 | ............. | B24C/7/00 |
| JP | 2000-094330 | 4/2000 | | |

* cited by examiner

Primary Examiner—Allen Ostrager
Assistant Examiner—John S Goetz
(74) Attorney, Agent, or Firm—Finnegan, Henderson, Farabow, Garrett & Dunner LLP

(57) ABSTRACT

An improved apparatus for detecting the intensity of shot peening by detecting at least one of the number of shot that have collided with the apparatus and the intensity of the colliding shot, comprising a box-like case having an opening at its top; a first resilient member disposed under the top of the case; a hollow supporting member resiliently supported in the case between the first resilient member and a second resilient member which is mounted in the case, the hollow supporting member including a third resilient member mounted therein; a shot collision propagating member supported by the hollow supporting member to close the opening of the top of the box-like case by way of the first resilient member, the shot collision propagating member producing and propagating an elastic wave when colliding with a shot; a transducer, for receiving the propagating elastic wave from the shot collision propagating member and converting the elastic wave to high frequency signals, disposed in the hollow supporting member and resiliently supported by the third resilient member such that a top surface of the transducer contacts a lower surface of the shot collision propagating member; and a cable passing through the hollow supporting member so as to be connected at one end to the transducer and to be connected at the other end to a measuring circuit.

14 Claims, 2 Drawing Sheets

APPARATUS FOR DETECTING INTENSITY OF SHOT PEENING AND REPLACEMENT UNIT FOR THE APPARATUS

FIELD OF THE INVENTION

This invention relates to an apparatus that can detect the intensity of shot peening while the peening is being performed, and it also relates to a replacement part or unit for the apparatus.

DESCRIPTION OF THE PRIOR ART

Conventionally, the degree to which shot peening is performed is measured by a method of observing the average projection intensity of shot or a method of observing the projection density of shot. In the method of observing the projection intensity of shot, a piece of thin steel plate bends back when a shot collides with it, and the height of the bend (the height of the arc) is measured by a gage. In the method of examining the projection density of shot, the shot are projected onto a piece of thin steel plate and a picture of the dents formed in the steel plate by the shot is taken to observe the rate (or the coverage) of the dents.

However, since in both methods the steel plate is taken out to observe it after the shot peening is performed, they are not available if the shot peening is performed while the amount of the shot is being observed, so as to perform it under the optimum conditions, although they are suitable for predetermining the conditions for projecting the shot.

Thus the applicant discloses a device for detecting the intensity of shot peening, which is described in JP 4-19071 A. The device comprises a shot collision propagating member, which is structured as one body or connected parts of a shot collision portion for generating an elastic wave when a shot collides with it and a propagating portion for propagating the generated elastic wave; an outer case of a U-shaped cross section which the shot collision propagating member bridges and is fixed to; a transducer connected to the shot collision propagating member for receiving the propagating elastic wave and converting it to high frequency signals to output them; and a measuring circuit including a counter circuit connected to the transducer for detecting the number of generated solitary waves of the high frequency signals and a peak value detecting circuit for detecting the peak values of the solitary waves of the high frequency signals.

However, the device is large and it is difficult to use in some cases. Further, its portability and work efficiency are poor.

Further, since the recent, popular shot peening by fine shot (for example, 20–150 μm in diameter) uses a great number of shot, the device discussed above cannot treat the signals of each collision as a solitary wave. Thereby it fails to measure the intensity of the shot peening. In view of this problem, the applicant discloses (in JP2000-94330 A) a device for automatically detecting the intensity of shot peening that uses fine shot. However, in these conventional devices for detecting the intensity of shot peening, the output from them tends to be changed, or affected, due to any change in temperature, and the maintenance of them takes much time. As a result of keenly studying these problems, the inventors have conceived the present invention.

SUMMARY OF THE INVENTION

The present invention has been conceived in view of these problems. The purpose of it is to provide an apparatus for automatically detecting the amount and the intensity of shot during shot peening, and which is portable and works effectively. Another purpose of it is to provide a replacement unit for the apparatus, for which unit the initial setting and maintenance are easy.

To attain the above end, the apparatus of the present invention is an improved apparatus for detecting the intensity of shot peening by detecting at least one of the number of shot that have collided with the apparatus and the intensity of the colliding shot, comprising a box-like case having an opening at its top; a first resilient member disposed under the top of the case; a hollow supporting member resiliently supported in the case between the first resilient member and a second resilient member which is mounted in the case, the hollow supporting member including a third resilient member mounted therein; a shot collision propagating member supported by the hollow supporting member to close the opening of the top of the box-like case by way of the first resilient member, the shot collision propagating member producing and propagating an elastic wave when colliding with a shot; a transducer, for receiving the propagating elastic wave from the shot collision propagating member and converting the elastic wave to high frequency signals, disposed in the hollow supporting member and resiliently supported by the third resilient member such that a top surface of the transducer contacts a lower surface of the shot collision propagating member; and a cable passing through the hollow supporting member so as to be connected at one end to the transducer and to be connected at the other end to a measuring circuit.

To attain the above end, the replacement unit for the apparatus includes the hollow supporting member including the third resilient member, the transducer, and the shot collision propagating member.

According to the apparatus of the present invention, the amount and the mean projection intensity of shot can be detected during shot peening without being affected by the temperature. Further, the apparatus has advantages in portability and working efficiency.

The inventors have found that the reason for the change in the output of the conventional device for detecting the intensity of shot peening, in particular, for the change when fine shot are used, is that an adhesive is used between the contacting surfaces of the shot collision propagating member and the transducer. Thus, to avoid any effect of the temperature, they chose the surface contact by using a resilient support. The reason that the maintenance takes much time is that there are problems such as the contacting surfaces peeling off during the maintenance because of the adhesive being used between them.

Further, by using the replacement unit of the invention, maintaining the apparatus will be easy, since the maintenance requires that only the unit be tested.

DESCRIPTION OF THE PREFERRED EMBODIMENT

Figure 1:
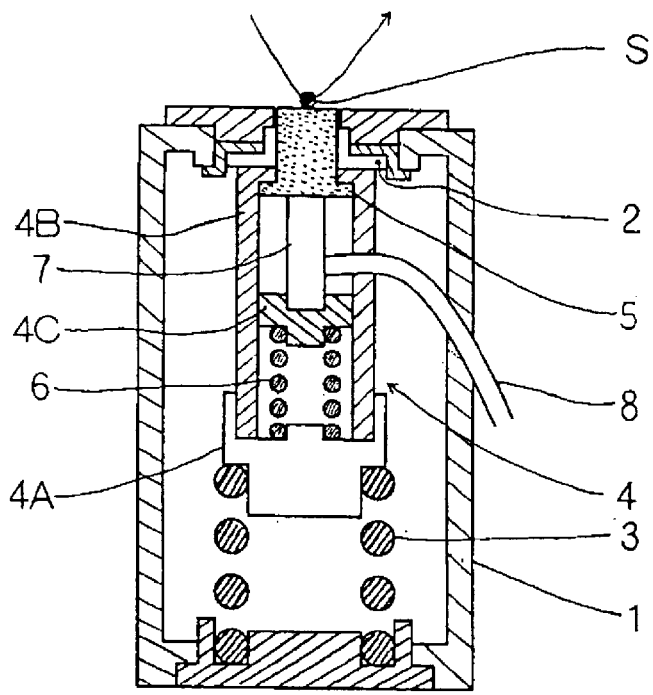
FIG. 1 is a partially cross-sectional-view of an embodiment of the apparatus of the present invention.

In this invention, shot denotes projectiles, of any size and any material, used for shot peening or shot blasting. A box-like case denotes a case having a cavity therein. It can be of any box-like shape, as, for example, a square or polygonal column, a Cylindrical column, or a parallelepiped. Further, the opening of the case is preferably circular, for easy machining, but it may be of any other shape. If the size of the opening is in the range of 20–10 mm in diameter, that is especially suitable for evaluating the partial peening ability.

The reason for resiliently supporting the supporting member, the shot collision propagating member, and the transducer by the first, second, and third resilient members is to propagate elastic waves caused by just the collisions of shot with the shot collision propagating member. If the second resilient member is a great-load deformable resilient member, and if the third resilient member is a small-load deformable resilient member relative to it, that is an advantage in that stable measuring is performed. If both the second and third resilient members are coil springs, they can be easily replaced for stable measuring.

The supporting or hollow supporting member denotes a member that supports the shot collision propagating member or the transducer or both. Any material may be used for it. If the shot collision propagating member is made of super hard material, ceramic, heat-treated metal (for example tool steel high-speed steel, and die steel), or heat-treated non-ferrous metal (for example, an aluminum alloy), it would be abrasion resistant and would have a long life. The transducer can be of any type as long as it can quickly and successively convert elastic waves, which generate at very short time intervals (for example, 5 ms), to electrical signals. It may be a piezoelectric element such as an AE sensor, a crystal, or a lithium sulfate; an electrostrictive element such as a barium titanate or a zircon lead titanate; a high frequency converting element made by deposition; or the like.

The term "cable passing through the supporting member" denotes that the measuring circuit that is connected to the cable is located outside the supporting member. The measuring circuit may be any one of the various circuits that will be described below. The reason that the contacting surfaces of the transducer and the shot collision propagating member contact each other without using an adhesive is to exclude the effect of the temperature as much as possible. If the contacting surfaces have a mean roughness of 3 μm or less, the generated elastic waves would propagate well. If the mean roughness of the contacting surfaces were greater than 3 μm, good contacting surfaces would not be formed for good propagation, and stable measurements would not be obtained.

By making the size of the apparatus so that it can be portable, its work efficiency becomes good. If the case is made of steel, a metal composite, ceramic, or a plastic composite, the transducer and the cable would be protected from the shot. The material for the case may be of any material, as long as it is durable against the impulses of the shot. If the case is made of one of the materials discussed above, it is advantageous in machining, and in its availability in the market.

The embodiment of the apparatus of the present invention is now explained by reference to the accompanying drawings. In FIG. 1 the device for detecting the intensity of shot peening has a case 1 provided with an opening formed in its top. A first resilient member 2, which is, for example, a rubber spring, or a rubber vibration insulator, is disposed under the top of the case 1, while a second resilient member 3 is mounted in the case 1 at its lower part. A hollow supporting member 4 is resiliently supported in the case 1 between the first resilient member 2 and the second resilient member 3. A shot collision propagating member 5 is supported by the supporting member 4 and the first resilient member 2 such that the members 5 and 2 close the opening. The case is structured such that one part of it can be separated from the remaining part.

Figure 2:
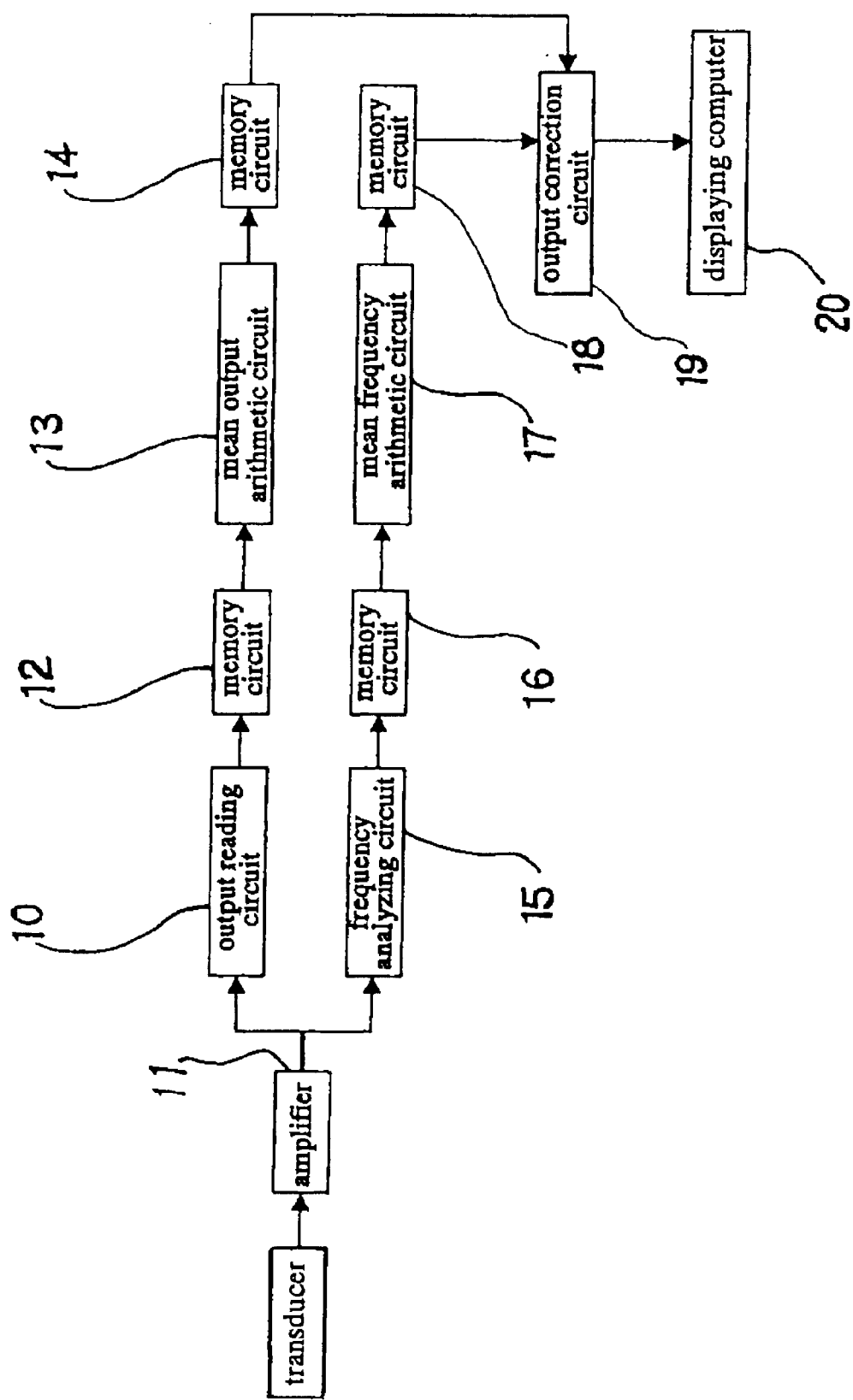
FIG. 2 is a block diagram of a measuring circuit used in the apparatus shown in FIG. 1.

The shot collision propagating member 5 has a part that receives shot S and generates elastic waves and another part that propagates the generated elastic waves. A third resilient member 6 is mounted in the hollow supporting member 4, in which a transducer 7 is resiliently supported by the third resilient member 6 through an intermediate portion 4C such that the top surface of the transducer 7 contacts the bottom surface of the shot collision propagating member 5. The transducer receives the elastic waves, converts them to high frequency signals, and outputs the signals. The transducer 7 is electrically connected to a measuring circuit (which is shown in FIG. 2) through a cable 8, which passes through the hollow supporting member. The shot collision propagating member 5 is made of antifriction material, and its upper and lower surfaces are polished. Further, the top surface of the transducer 7 has a roughness of 3 μm or less.

The measuring circuit as shown in FIG. 2 is now explained. The distal end of the cable 8 is connected, through an amplifier 11, to an output reading circuit 10 for reading output values of the high frequency signals. The output reading circuit 10 reads the output values per time interval T1 (for example, 200 μs), and a memory circuit 12, which is connected to the output reading circuit 10, stores the output values sent from the circuit 10 per time interval T1. A mean output arithmetic circuit 13 reads the output values stored in the memory per time interval T2 (for example, 0.2 s) and calculates the mean output value of the output values. The mean output values per time interval T2 are stored in a memory circuit 14, which is connected to the mean output arithmetic circuit 13.

The method for calculating the mean output value sizes all the output values in descending order, deletes some first (large) output values, selects some first output values from the remaining output values, and then calculates the mean output value of the selected output values. However, another method may be used. It calculates the mean output value of all the output values, selects as the mean output value an output value that appears most frequently, or selects as the mean output value the center of gravity of the area of the frequency distribution of the output values.

The distal end of the cable 8 is also connected, through the amplifier 11, to a frequency analyzing circuit 15 that analyzes the frequency of the high frequency signals. The frequency analyzing circuit 15 reads the frequency per time interval T1, and a memory circuit 16 stores the values of the frequency per time interval T1. A mean frequency arithmetic circuit 17 which is connected to the memory circuit 16, reads the values of the frequency from it per time interval T2 and calculates the mean frequency value of the values. This mean frequency value per time interval T2 is stored in a memory circuit 18, which is connected to the mean frequency arithmetic circuit 17.

The method for calculating the mean frequency value selects as the mean frequency value a frequency value that appears most frequently. However, another method may be used. It calculates the mean frequency value of all the frequency values, selects as the mean frequency value the center of gravity of the area of the frequency distribution of the frequency values, or calculates the mean frequency value in a manner similar to that for calculating the mean output value as discussed above.

The data on the mean output value per time interval T2 stored in the memory circuit 14 and on the mean frequency value per time interval T2 stored in the memory circuit 18 are sent to an output correction circuit 19, which is connected to both the memory circuits 14 and 18. The output correction circuit 19 corrects each mean output value by a corresponding mean frequency value and sends the data on the corrected output value to a computer 20. In this correction the output properties of the transducer 7 relating to the frequency were previously stored in the output correction circuit 19, and by using the properties the mean output value was corrected.

Figure 3:
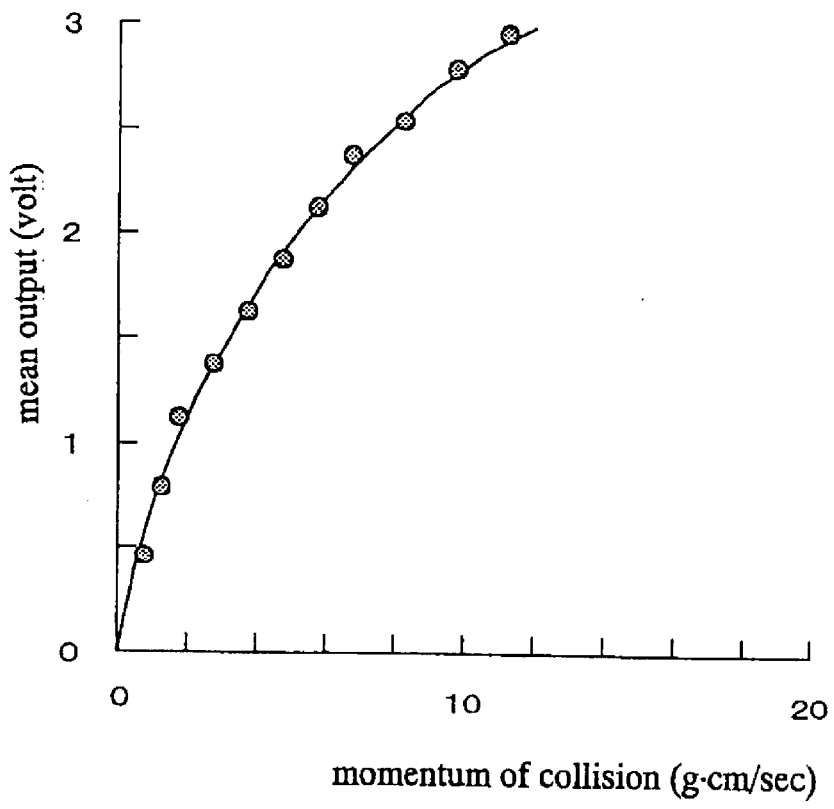
FIG. 3 is a graph showing the relationship between the mean output and the momentum of the shot collision.

The relationship of the mean output, which has been obtained as discussed above, and the momentum of the shot collision, is shown in FIG. 3. From it, it is observed that a characteristic equation is obtained that shows the relationship between the momentum of the shot collision and the mean output. It is found that similar measurements are obtained even when the circuits 15, 16, 17, 18, and 19 are excluded, wherein the mean output per time interval T2 is not corrected and the data on it is sent directly to the computer 20.

The elements located between the first and third resilient member, namely, the hollow supporting member 4, including the second resilient member 6, the transducer 7, and the shot collision propagating member 5, are combined as a replacement unit. This unit provides easy maintenance for the apparatus, since only the initial setting, replacement, and maintenance per unit are required. The hollow supporting member 4 is structured, as in FIG. 1, by a lower portion 4A and an upper portion 4B, between which the third resilient member 6 is resiliently supported. This structure provides the replacement unit. Conventionally, individual members are tested and then combined, and the combined elements, as a device for detecting the intensity of shot peening, are tested. Thus much time is consumed.

The embodiment explained above is exemplary only. One skilled in the art can understand that any changes and modifications can be made. Such changes and modifications are intended to be included within the scope of the present invention.

What we claim is:

1. An improved apparatus for detecting an intensity of shot peening by detecting at least one of the number of shot that have collided with the apparatus and an intensity of the colliding shot, comprising:
    a box-like case having an opening at a top thereof;
    a first resilient member disposed under the top of the case;
    a hollow supporting member resiliently supported in the case between the first resilient member and a second resilient member which is mounted in the case, the hollow supporting member including a third resilient member mounted therein;
    a shot collision propagating member supported by the hollow supporting member to close the opening of the top of the box-like case by way of the first resilient member, the shot collision propagating member producing and propagating an elastic wave when colliding with a shot;
    a transducer, for receiving the propagating elastic wave from the shot collision propagating member and converting the elastic wave to high frequency signals, disposed in the hollow supporting member and resiliently supported by the third resilient member such that a top surface of the transducer contacts a lower surface of the shot collision propagating member; and
    a cable passing through the hollow supporting member so as to be connected at one end to the transducer and to be connected at the other end to a measuring circuit.

2. The apparatus of claim 1, wherein the second resilient member is a great-load deformable resilient member, and the third resilient member is a small-load deformable resilient member.

3. The apparatus of claim 2, wherein both the second and third resilient members are coil springs.

4. The apparatus of any one of claims 1 to 3, wherein the top surface of the transducer directly contacts the lower surface of the shot collision propagating member without using an adhesive on the contacting surfaces.

5. The apparatus of any one of claims 1 to 3, wherein contacting surfaces of the top surface of the transducer and the lower surface of the shot collision propagating member that contact each other have an average roughness of 3 $\mu$m or less.

6. An improved apparatus for detecting an intensity of shot peening by detecting at least one of the number of shot that have collided with the apparatus and an intensity of the colliding shot, comprising:
    a box-like case having an opening at a top thereof;
    a resilient member disposed under the top of the case;
    a supporting member resiliently supported in the case between the resilient member and a great-load deformable coil spring which is mounted in the case, the supporting member having a lower portion and a hollow, upper portion, the hollow, upper portion including a small-load deformable coil spring mounted therein and an intermediate supporting portion mounted on the small-load deformable coil spring;
    a shot collision propagating member mounted in the hollow, upper portion of the supporting member to close the opening of the top of the box-like case by way of the resilient member, the shot collision propagating member producing and propagating an elastic wave when a shot collides with the resilient member;
    a transducer, for receiving the propagating elastic wave from the shot collision propagating member and converting the elastic wave to high frequency signals, disposed in the hollow, upper portion and resiliently supported by the small-load deformable coil spring through the intermediate supporting portion such that a top surface of the transducer contacts a lower surface of the shot collision propagating member; and
    a cable passing through the supporting member to be connected at one end to the transducer and to be connected at the other end to a measuring circuit.

7. An improved apparatus for detecting an intensity of shot peening by detecting at least one of the number of shot that have collided with the apparatus and an intensity of the colliding shot, comprising:
    a box-like case having a circular opening of 20 mm–10 mm in diameter at a top thereof;
    a first resilient member disposed under the top of the case;
    a hollow supporting member resiliently supported in the case between the first resilient member and a second resilient member which is mounted in the case, the hollow supporting member including a third resilient member mounted therein;
    a shot collision propagating member supported by the hollow supporting member to close the opening of the top of the box-like case by way of the first resilient member, the shot collision propagating member producing and propagating an elastic wave when colliding with a shot;

a transducer, for receiving the propagating elastic wave from the shot collision propagating member and converting the elastic wave to high frequency signals, disposed in the hollow supporting member and resiliently supported by the third resilient member such that a top surface of the transducer contacts a lower surface of the shot collision propagating member; and a cable passing through the hollow supporting member so as to be connected at one end to the transducer and to be connected at the other end to a measuring circuit, wherein the apparatus is of a size so as to be carried by just one hand.

8. The apparatus of claim 7, wherein the case is made of a material selected from steel, a metal composite, ceramic, and a plastic composite.

9. The apparatus of claim 7 or 8, wherein the shot collision propagating member is made of a material selected from superhard material, ceramic, heat-treated metal, and heat-treated non-ferrous metal.

10. The apparatus of claim 1, further comprising the measuring circuit, wherein the measuring circuit includes an output reading circuit connected to the transducer for reading an output of the high frequency signals from the transducer per time interval T1; a memory circuit connected to the output reading circuit for storing the output of the high frequency signals; an arithmetic circuit connected to the memory circuit for reading per time interval T2 (T2>>T1) each output stored in the memory circuit and for calculating a mean output of the read outputs; and a memory circuit for storing the calculated mean output of the high frequency signals.

11. The apparatus of claim 6, further comprising the measuring circuit, wherein the measuring circuit includes an output reading circuit connected to the transducer for reading an output of the high frequency signals from the transducer per time interval T1; a memory circuit connected to the output reading circuit for storing the output of the high frequency signals; an arithmetic circuit connected to the memory circuit for reading per time interval T2 (T2>>T1) each output stored in the memory circuit and for calculating a mean output of the read outputs; and a memory circuit for storing the calculated mean output of the high frequency signals.

12. The apparatus of claim 7, further comprising the measuring circuit, wherein the measuring circuit includes an output reading circuit connected to the transducer for reading an output of the high frequency signals from the transducer per time interval T1; a memory circuit connected to the output reading circuit for storing the output of the high frequency signals; an arithmetic circuit connected to the memory circuit for reading per time interval T2 (T2>>T1) each output stored in the memory circuit and for calculating a mean output of the read outputs; and a memory circuit for storing the calculated mean output of the high frequency signals.

13. The apparatus of any one of claims 10–12, further comprising a frequency analyzing circuit connected to the transducer for reading a frequency of the high frequency signals from the transducer per time interval T1 and for analyzing the frequency; a memory circuit connected to the frequency analyzing circuit for storing the frequency of the high frequency signals; an arithmetic circuit connected to the memory circuit for storing the frequency, for reading per time interval T2 (T2>>T1) each frequency stored in the memory circuit for storing the frequency and for calculating a mean frequency of the read frequencies; a memory circuit for storing the calculated mean frequency of the high frequency signals; and an output correction circuit connected to the memory circuit for storing the calculated mean frequency, for correcting the mean output of the time interval T2 by the corresponding mean frequency.

14. A replacement unit to be used in an improved apparatus that detects an intensity of shot peening by detecting at least one of the number of shot that have collided with the apparatus and an intensity of the colliding shot, the apparatus comprising a box-like case having an opening at a top thereof; a first resilient member disposed under the top of the case; a hollow supporting member resiliently supported in the case between the first resilient member and a second resilient member which is mounted in the case, the hollow supporting member including a third resilient member mounted therein; a shot collision propagating member supported by the hollow supporting member to close the opening of the top of the box-like case by way of the first resilient member, the shot collision propagating member producing and propagating an elastic wave when colliding with a shot; and a transducer, for receiving the propagating elastic wave from the shot collision propagating member and converting the elastic wave to high frequency signals, disposed in the hollow supporting member and resiliently supported by the third resilient member such that a top surface of the transducer contacts a lower surface of the shot collision propagating member, the replacement unit comprising the hollow supporting member including the third resilient member, the transducer, and the shot collision propagating member.

* * * * *